United States Patent [19]

Brickett

[11] Patent Number: 6,095,838
[45] Date of Patent: Aug. 1, 2000

[54] SLIDING BYPASS VALVE CONNECTOR

[76] Inventor: Benjamin P. Brickett, 68 Pleasant St., Eliot, Me. 03903

[21] Appl. No.: 09/157,545

[22] Filed: Sep. 21, 1998

[51] Int. Cl.[7] .................................................. H01R 4/64
[52] U.S. Cl. ........................................ 439/201; 439/278
[58] Field of Search .................................. 439/201, 202, 439/199, 200, 144, 190, 191, 192, 198, 205, 206, 272, 274, 275, 436, 276, 278, 283, 271, 279

[56] References Cited

U.S. PATENT DOCUMENTS

| | | |
|---|---|---|
| 3,643,207 | 2/1972 | Cairns . |
| 3,643,208 | 2/1972 | Messa, Jr. . |
| 3,772,636 | 11/1973 | Webb . |
| 3,780,243 | 12/1973 | Koomey et al. . |
| 3,816,641 | 6/1974 | Iversen . |
| 3,845,450 | 10/1974 | Cole et al. . |
| 3,963,297 | 6/1976 | Panek et al. ............................. 439/204 |
| 4,085,993 | 4/1978 | Cairns . |
| 4,188,084 | 2/1980 | Buresi et al. ........................... 439/201 |
| 4,192,569 | 3/1980 | Mucci . |
| 4,203,640 | 5/1980 | Bice et al. . |
| 4,373,767 | 2/1983 | Cairns ..................................... 439/275 |
| 4,390,229 | 6/1983 | Chevalier ............................... 439/201 |
| 4,589,717 | 5/1986 | Pottier et al. ........................... 439/277 |
| 4,606,603 | 8/1986 | Cairns . |
| 4,616,900 | 10/1986 | Cairns . |
| 4,666,242 | 5/1987 | Cairns . |
| 4,733,935 | 3/1988 | Gandy . |
| 4,795,359 | 1/1989 | Alcock et al. . |
| 4,808,127 | 2/1989 | Swanic . |
| 4,896,939 | 1/1990 | O'Brien . |
| 4,907,982 | 3/1990 | Wagaman . |
| 4,940,416 | 7/1990 | Wagaman et al. ..................... 439/204 |
| 4,948,377 | 8/1990 | Cairns ..................................... 439/200 |
| 5,194,012 | 3/1993 | Cairns . |
| 5,203,805 | 4/1993 | Cairns ..................................... 439/199 |
| 5,645,438 | 7/1997 | Cairns ..................................... 439/139 |
| 5,645,442 | 7/1997 | Cairns ..................................... 439/201 |
| 5,685,727 | 11/1997 | Cairns . |
| 5,722,842 | 3/1998 | Cairns ..................................... 439/139 |
| 5,772,457 | 6/1998 | Cairns ..................................... 439/201 |
| 5,838,857 | 11/1998 | Niekrasz ................................... 385/56 |
| 5,899,765 | 5/1999 | Niekrasz et al. ........................ 439/201 |

Primary Examiner—Gary F. Paumen
Assistant Examiner—Ross Gushi
Attorney, Agent, or Firm—Devine, Millimet & Branch, P.A.; Paul C. Remus; Kristin Kohler

[57] ABSTRACT

A pressure compensatable mateable connector for use in hostile environments, or environments where the contacts to be connected must be protected from the environment, comprising a plug connector half and a receptacle connector half which are mateable and de-mateable multiple times. The connector may be used for electrical, fiber optic, hybrid electro-optic, hydraulic and gas or vapor connections. The plug connector half comprises at least one isolated mating probe contact immersed in a pressure transfer medium, and contained in an isolation envelop which partially comprises a free-sliding flexible rubber-like tube which is sealed at both the rear and mating ends and wherein the mating probe contact enters the flexible tube through a hermetic fitting snugly fitted to the rear end of the flexible tube. The flexible tube may have one or more axial slits. The receptacle connector half comprises at least one receptacle isolated contact immersed in pressure transfer/compensating medium, and a sliding bypass valve, wherein each mating probe contact must pass the sliding bypass valve in order to connect with each receptacle isolated contact. The connector may be used in any environment where it is desirable to isolate the contacts from the outside environment including, undersea, outer space, volatile atmosphere, and normal pressures and environments for example, telecommunications applications where it is desirable to protect and isolate the contacts. The sliding bypass valve enables connections to be made wherein the contacts to be mated are completely protected, yet the connector is easy to mate and demate repeatedly without failure.

21 Claims, 12 Drawing Sheets

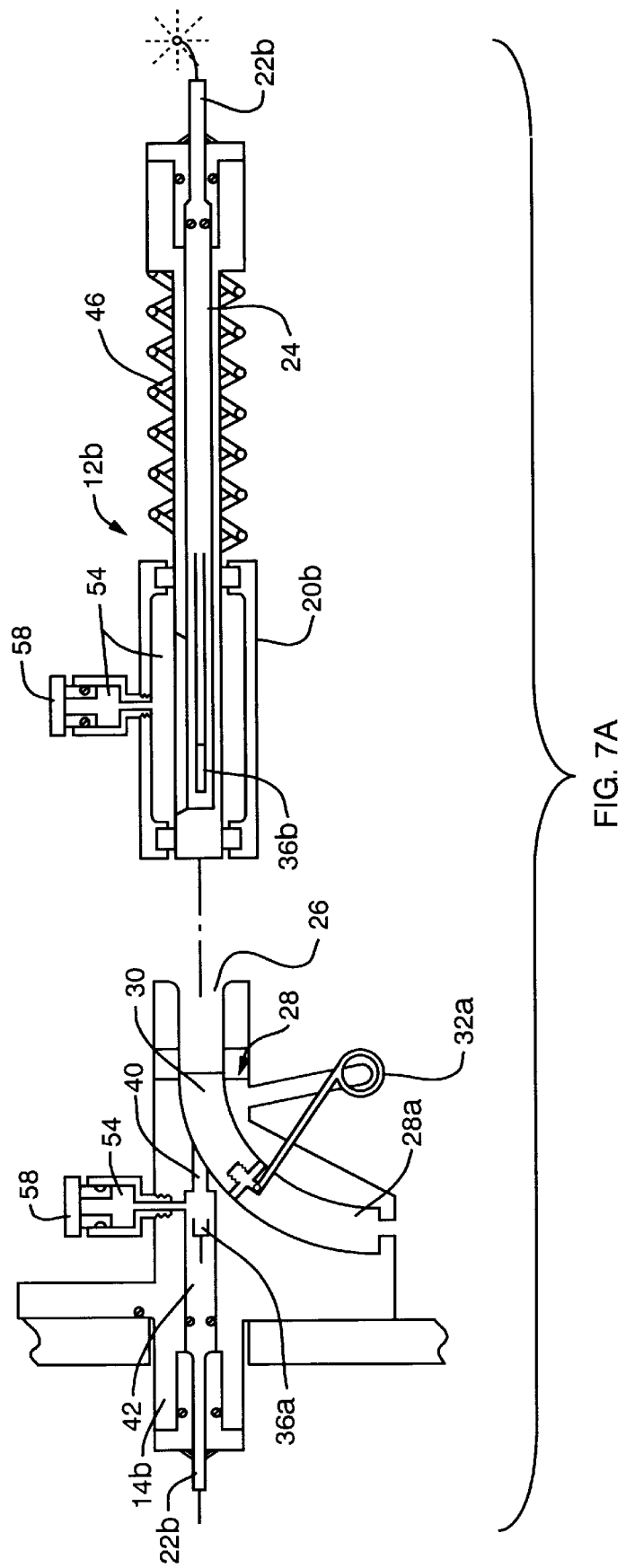

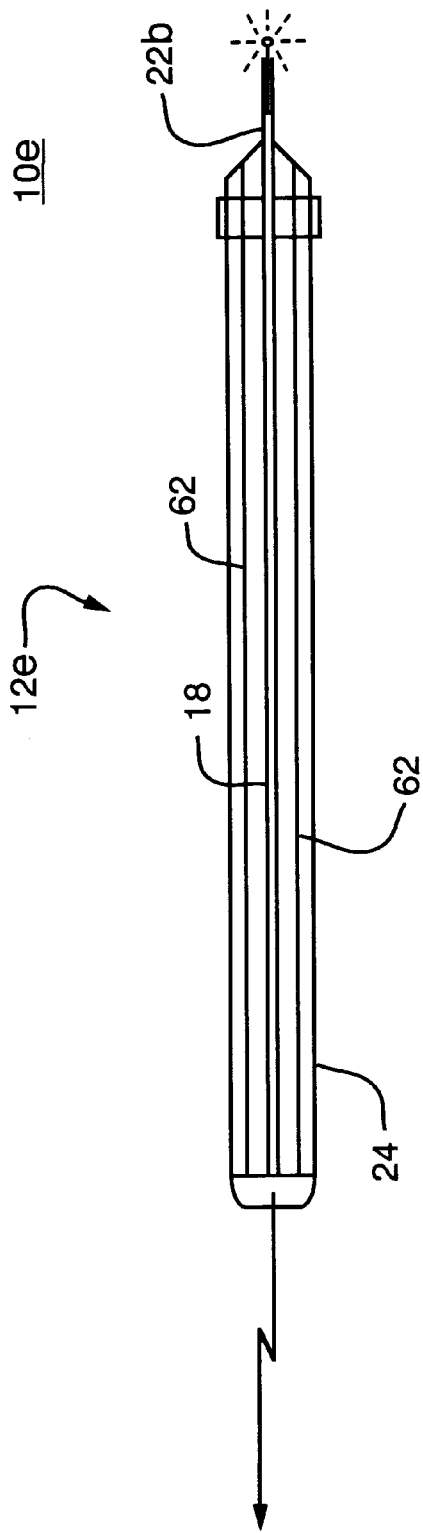
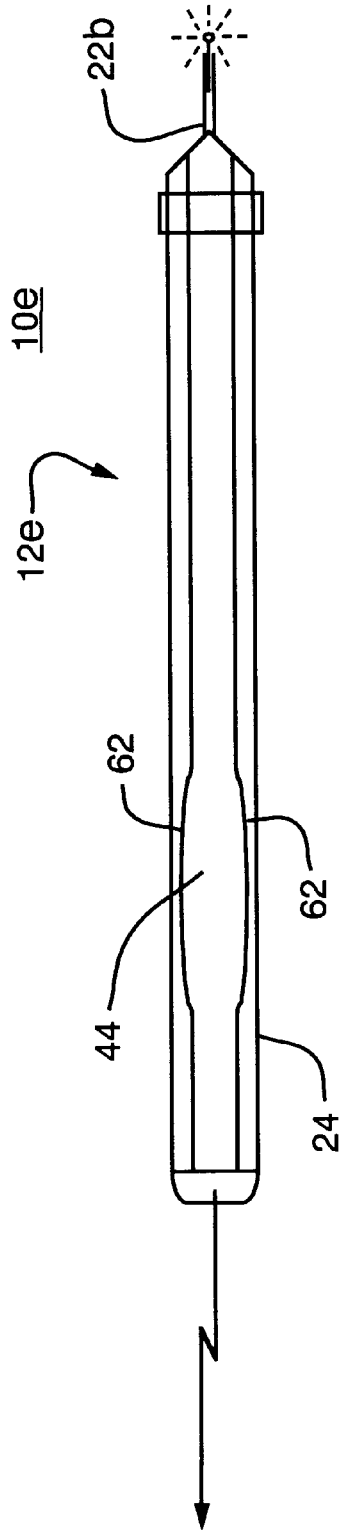

SLIDING BYPASS VALVE CONNECTOR

FIELD OF THE INVENTION

The invention relates generally to matable connections for use in hostile environments. More specifically the invention relates to mutable connectors for use in environments having pressure extremes, such as extremely high pressure undersea environments, or vacuum conditions found in outer space, or in potentially explosive or volatile environments. The invention may be used in any environment where there is high volatility or sensitivity of the connected medium to external conditions. The invention is also used at normal atmospheric pressures without pressure compensation. Most specifically the invention relates to in situ matable pressure compensatable electrical, optical, hybrid electro-optical, hydraulic or gas connections.

BACKGROUND OF THE INVENTION

There are many types of connectors for making circuit and hydraulic connections in hostile environments such as under water. The majority of these known connections must be made in a controlled environment prior to exposure to the hostile environment. With the advent of rapid growth in oceanographic exploration, it has become necessary to provide underwater electrical, optical and hydraulic equipment which is both reliable and relatively inexpensive and easy to work with while underwater. Underwater circuit connectors for interconnecting cables and hoses are an essential component in many underwater systems such as offshore oil drilling platform systems and defense sector applications. The reliability of these connectors is critical because a failed connector can cause serious adverse effects on the operation of the sub-sea system. Common causes of connector failure include corrosion due to cathodic effects, the salt water environment, the inability to isolate the circuit contacts from the environments, designs which allow tolerances of multiple dimensions to become additive causing the connector to exceed specification or designs, all of which present potential problems for a diver, or automated means, attempting assembly or decoupling of a connector. There have been improvements in corrosion resistance of connectors as the art has developed but there is still a need for a more easily assembled connector that will not fatigue and which has a simple, design that is inexpensive to manufacture. Connectors in the past have relied mainly on an interference or compression of resilient members for sealing of internal components. Past connectors also have been limited in the number of circuits which can be utilized in the connector.

One category of connectors includes connectors intended for sub-sea mating and demating and offers the ability to mate and demate circuits under water. Such underwater connectors typically comprise a receptacle or female connector connected to one cable end and a plug or male connector connected to the other cable end and designed for mating engagement with the receptacle. These parts must be designed such that they can be connected underwater, and can be repeatedly mated and demated underwater. In one type of underwater connector, the circuits are isolated from the environment by having the receptacle socket filled with dielectric fluid or a semi-mobile compound. The female portion (or receptacle) contains electrical or optical contacts within a sealed hermetic chamber. The male portion (or plug) has one or more contact probes exposed to the environment prior to engagement. The probe(s) enter the sealed hermetic chamber and contact the female contact elements in the sealed receptacle chamber to make the connection.

Historically these types of connectors are precision machined mechanical devices which utilize complex sealing mechanisms to contain the protective medium yet allow mating of the connector circuits. Costs associated with the manufacture of these devices are substantial, and have typically resulted in selling prices of such magnitude that the utilization of these products has been limited to only the most critical of systems.

The major problem with past under water connectors, which has resulted in the expensive, complicated sealing mechanisms, has been ensuring that seawater cannot enter the connection chamber and that fluid in the connection chambers can not leak out, especially over time. The longevity of many current systems is questionable due to the "cold set" of seals such that the seals become inflexible due to loss of memory and are no longer able to function properly.

Several general types of different sealing mechanisms have been devised in the past for sealing the connectors as the connection is made. One such sealing mechanism has an opening into the mating/connection chamber which comprises an elastomeric tubular entrance surrounded by an elastomeric sphincter that pinches the entrance closed upon itself, in the unmated condition. In the mated condition, the sphincter pinches against the entering probe. Although this type of seal is successful in some cases, it does have some drawbacks. One drawback is that seals of this type do not work well in all conditions. Another drawback is that such seals will lose their "memory" after they have been mated and demated a number of times, and will then fail to close quickly enough to isolate the chamber from the surrounding environment.

There are various other means for assuring isolation of the contacts from the environment. Some existing means for isolation, used in various different connectors, include rotating seal valves, tubular socket contacts in the receptacle unit, and spring-biased pistons which are urged into sealing engagement with the open ends of the sockets. In the piston arrangement, as the plug and receptacle units are mated, pins on the plug portion urge the pistons back past contact bands in the sockets, so that electrical contact is made. However, this type of arrangement can not be used in an optical connector since the optical contacts must be able to engage axially for practical purposes.

To date, the known mechanisms for providing optical and electrical connections in a hostile environment are not completely effective. Additionally, the optical connectors available are expensive, and generally require complicated means for terminating the connector elements to the transmission cables they are intended to connect. The presently known connectors can not provide an inexpensive connector for making reliable and repeatable optical and electrical connections in hostile environments such as great ocean depths, outer space, or outdoor environments.

A subcategory of connectors intended for subsea mating and demating, includes connectors that are fluid filled and pressure balanced. In general, fluid filled connectors have a closed chamber wherein there is an oil filled chamber with an opening which is sealed by a spring-biased slidable shuttle piston arranged to be pushed back by engagement of a projecting male contact pin with the piston. In the unmated condition, the opening seals against the elongate section of a piston contained within the receptacle socket assembly, and resiliently biased outwardly so as to follow the male probe into the opening as the probe is withdrawn. The opening is always sealed, either by being filled with the piston, or with the male probe. By providing a shuttle piston, very little, if any distortion of the opening is required, and the opening can be quite large to permit large pin diameters for heavy current and/or a multi service arrangement such as coaxial connection. The opening of the chamber is closed either by the shuttle position in the unmated condition of the connector, or by the male contact pin when the male and female parts of the connector are brought together. A seal for the opening is provided in the form of a pair of spaced o-rings for engaging the shuttle piston or the contact pin, depending on which of these extends through the opening.

The intention of the fluid filled connectors is to protect the electrical junctions from the outside environment by enclosing them within a chamber of benign, non-conductive, mobile, dielectric substance such as oil, gel, or grease, from which seawater is excluded. These types of connectors are also spark-proof. They can be mated and demated with the receptacle sockets electrically energized. Any arcing is contained within the oil filled chamber and is partially suppressed by the oil. Therefore these types of connectors could be used in volatile atmospheres without danger of spark-induced explosions. However, many of these connectors are relatively large, and can not accommodate a large number of electrical contacts, and are limited therefore in their uses. Nor are the pin contacts in the plug of many of these current connectors protected from the environment in the unmated condition, resulting in contact corrosion and failure.

With this arrangement, (having the probe contacts exposed to the atmosphere) there is a risk of deterioration of the seal which may result in water or contaminants entering the chamber where the electrical connection is made. Thus, there were developed connectors with two chambers, one before or outside of the second, such that if the seal on the first chamber weakened, the seal on the second chamber would still maintain the isolation of the electrical contact from the contaminating environment that penetrated the first chamber.

With interference type seals or o-ring sealing members, as the connectors, mated or unmated, are lowered into the sea and subjected to greater and greater pressures, a differential pressure builds up across the sealing means and eventually the seal may fail and water enter the connectors. In response to this problem there were developed connectors that eliminated differential pressures across the sealing means of the connector. One type of such connector has resiliently deformable conduits which, when subjected to pressure, increase the pressure of the nonconducting fluid within the connector against o-ring seals so that the pressure of the nonconducting fluid within the conduit and the housings equals the pressure of the seawater external to the housings. Since there is little or no differential pressure across the o-ring seals sea water will not enter the plug or receptacle housing. Since the conduit is resiliently compressible, as the cable and connector assembly go to greater depths and the sea water pressure against the conduit increases, the conduit compresses, thereby increasing the pressure of the nonconducting fluid so as to prevent seawater from entering into the connector assembly through the o-ring seals.

Also, in many known connectors capable of underwater connection, the power must be turned off when it is desired to break contact of the circuit because if the connections are left powered and unconnected, and seawater enters the connectors, electrolytic action will take place causing corrosion. Thus some connectors can not be left in place while disconnected with the power on. This is major drawback for undersea operations.

Thus there is the need for electrical, fiber optic, hybrid electro-optical, hydraulic and gas connectors that can be installed relatively easily in the field, yet are reliable, and that can be repeatedly mated and demated in a number of hostile environments such as under water, outer space or volatile environments. However, the previous connectors have various shortcomings, some of which have been discussed above, such as failing of the sealing mechanism of o-rings or openings in an elastomeric material. Other connectors use complicated adjacent plates that must be rotated to align passages through the plates, or gates that must be aligned, in order for the probe to enter the receptacle, all of which introduce moving parts that must be manufactured, manipulated correctly and which can fail. Another particular shortcoming is that the connectors are often extremely expensive and generally require complicated means for terminating the connector elements to the optical or electrical cables they are intended to eventually connect. Thus, many connectors, while reliable, are complicated and expensive. Some are also not easily adaptable for fiber optic or other types of connections.

Therefore it would be desirable to have a high performance connective device similar in purpose to the currently available connectors, and which could be repeatedly mated and demated in hostile environments, but which could be offered at a substantially lower price, and which would have a number of uses by being of a simple general design, without complicated mechanical parts that could easily fall, and which would provide flexibility and adaptability of use in many applications.

SUMMARY OF THE INVENTION

A basic embodiment of the invention is a pressure compensatable matable connector having preferably an electrical, optical, hybrid electro-optical, or hydraulic connection. The connection may also be a fluid flow connection, for natural gas, oil, gasoline, or sterile medical fluids for example. The invention may be used in such diverse applications as under water mating, outer space connections, and fluid connections to eliminate spillage such as in a vehicle fueling system. The forward insertion motion of the two overall connector halves activates the opening of individual port and valve seat mechanisms. As the two mating halves come together, flexible ports or slits open in the sidewall of protective flexible slidable tubes located within the confines of the plug half. Concurrently "sliding bypass valves" are opened in the receptacle, thereby allowing the two mating contacts to properly align and pass electrical, optical or other signal. At all times, while unmated, during mating, de-mating, and fully mated, the connector elements are protected from the outside environment medium. The outside ambient pressure, plus a slight positive pressure of about 2 psig, is transferred to the internal circuits or connectors at all times, and thus the inside pressure will vary directly to that of the outside environmental pressure, thus allowing the ability to mate and de-mate at any pressure or during pressure changes.

A particular embodiment of the invention is a pressure compensatable matable connect or comprising a plug assembly and a receptacle assembly which are joinable and un-joinable. The plug assembly further comprises at least one mating probe contact immersed in a pressure equalizing medium, wherein each mating probe contact is contained in an isolation envelope which may comprise in part a flexible slidable tube, formed from a low durometer, non-compressible rubber-like material with good memory, and which is sealed at both a rear end and a mating end. The pressure equalizing medium is preferably oil, grease, or other viscous liquid, powder, suspension, colloid, or like substance that aids in pressure equalization and can also aid in regulating temperature inside the connector. That at least one mating probe is contained within the flexible slidable tube, and enters the flexible slidable tube through a hermetic fitting snugly fitted to the rear end of the flexible slidable tube. The receptacle assembly has at least one receptacle isolated contact disposed in a connection chamber and immersed in pressure equalizing medium, an entrance passage and a sliding bypass valve through which each mating probe contact must pass in order to connect with each receptacle isolated contact. The receptacle assembly may also have a secondary chamber, intermediate to the entrance passage and the receptacle isolated contact, and which is smaller than the flexible slidable tube, such that the flexible slidable tube can not enter the secondary chamber while the at least one mating probe can. This secondary chamber functions with the sliding bypass valve. Because the shape of the receptacle is somewhat complex to machine, the receptacle connector half main body is preferably formed or cast from a polymer resin or polyethylene type molded material. However, both the receptacle half and the probe half may be formed of any corrosion resistant material that can be formed, machined, cast or molded.

The flexible slidable tube has at least one preferably axial slit cut in a portion of the wall of the flexible slidable tube near the mating end such that a portion of each at least one mating probe is exposable through the at least one axial slit upon flexing of the flexible slidable tube. The at least one axial slit may be of any length such that the probe may exit the slitted flexible slidable tube through the axial slit.

The isolation envelope may further comprise a rigid sheath containing pressure equalizing medium and surrounding a portion of the slitted flexible slidable tube and having a guiding means such that the at least one axial slit is aligned to assure the at least one mating probe exits the at least one axial slit. The rigid sheath also ensures that the at least one axial slit remains closed when the connector is unmated. The rigid sheath may be formed from materials including polymer resin, aluminum and copper or other like materials such as metals or metal hybrids that protect contact probe and the slitted flexible slidable tube.

The isolation envelope may, in an alternative embodiment, comprise a container having a flexible diaphragm wall wherein the container is filled with non-reactive pressure equalizing or transfer medium and encloses a portion of the slitted flexible slidable tube to ensure that the at least one axial slit remains closed when the connector is unmated and that the contact remains isolated.

In another embodiment, the isolation envelope of the plug assembly may comprise a container having a piston activated accumulator instead of a diaphragm. The container and the accumulator are filled with the pressure equalizing medium and as the pressure changes the accumulator compensates by the piston sliding in and out. The main body of the receptacle assembly may also have an accumulator, in flow communication with the connection chamber, to compensate for pressure changes in the connection chamber.

The SBV or sliding bypass valve, of the receptacle half or assembly, contains a truncated or semi C shaped or curved entrance passage and a main valve chamber. The entrance passage and valve chamber are preferably smooth-walled over the entire internal bore. The sliding bypass valve preferably also comprises a spring loaded piston assembly. There may be a skirted piston or plug which fits snugly, yet slides freely in either direction when lubricated, within the bore of the valve chamber. The piston, although relatively long, is capable of deforming in shape to allow it to pass freely yet snugly within the curved bore of the entrance passage and valve chamber. An axial displacement spring closes the sliding bypass valve and the secondary and connection chamber when not mated. The axial displacement spring may be internal or external to the valve chamber of the sliding bypass valve. During mating, the mating probe forces the skirted piston rearward from the entrance passage. In the closed, unmated condition, the axial displacement spring acts to force the piston to an outward position directly at the end of the entrance passage. With the piston in position at the end of the entrance passage, the entry port to the secondary chamber is sealed against the passage of liquid or gas from connection chamber, the valve chamber and the outside environment. The axial displacement spring, if internal, is retained within the valve chamber by a retaining pin, ring, or cap.

When a mating probe pushes against the exposed end of the piston, in the entrance passage, the piston will be forced rearward against the axial displacement spring. As the probe force increases, the piston will be pushed inward. As the probe half continues to enter the entrance passage, the skirted piston will also continue to travel inward, down the entrance passage, eventually passing the secondary chamber entry point and moving into the valve chamber. Liquid, gas or objects contained within the probe may now freely enter the secondary chamber and come in contact with the receptacle isolated contact. As the probe and the slitted flexible slidable tube encounter the smaller secondary chamber, the slitted flexible slidable tube can not enter the secondary chamber and continues down into the valve chamber while the probe, which can not flex and can not enter or follow the curved valve chamber, is forced through the at least one axial slit in the slitted flexible slidable tube, into the secondary chamber, and eventually into the connection chamber. Closing of the sliding bypass valve works in reverse of the opening process. As the plug mating probe is withdrawn, the axial displacement spring forces the piston back into the entrance passage of the receptacle half.

The sliding bypass valve may alternatively comprise an axially slitted seal, for example a flexible tube-like member, having at least one axial slit, and secured within the receptacle connector half between, and in flow communication with, the entrance passage and the connection chamber. The slitted flexible slidable tube is too large to fit into the axially slitted seal and, when mating, the at least one mating probe is forced out through the axial slit in the slitted flexible slidable tube and is also forced through the at least one axial slit in the axially slitted seal. The slitted flexible slidable tube is then forced into the valve chamber when the slitted flexible slidable tube meets the smaller axially slitted seal.

There may also be a return spring extending along the length of the slitted flexible slidable tube from, for example, the rigid sheath or the container, to the hermetically sealed rear end of the slitted flexible slidable tube such that when the plug connector half or plug assembly is pushed into the receptacle connector half or receptacle assembly, the return spring is compressed, by the sliding motion of the rigid sheath or container, along the flexible slidable tube towards the rear end of the slitted flexible slidable tube. When the plug half or plug assembly is uncoupled from the receptacle assembly, the return spring pushes the rigid sheath or container back along the slitted flexible slidable tube towards the mating end to again cover the at least one axial slit as the slitted flexible slidable tube is withdrawn from the receptacle assembly. The at least one axial slit is always contained within a seal or chamber.

The at least one mating probe contact and the at least one isolated contact are each connectable to a transmission means such as an electrical or fiber optic cable, or a flow line for, for example, oil or natural gas or other fluid such as even sterile medical fluids.

Accordingly, one aspect of the invention is to provide electrical, optical or other connection components that are maintained, at all times, in a non-reactive, pressure equalizing or balancing medium.

Another aspect of the invention is to provide a connector in which both halves contain contacts which are constantly submerged in a benign, non-reactive, pressure equalizing medium, and in which each individual circuit contact is hermetically isolated from other contacts, and from the outside environment, by the pressure equalizing or balancing medium which is a liquid, gel-like or similar viscous medium and which is contained within individual isolation envelop barriers.

A further aspect of the invention is to provide a high performance connective device that can be manufactured and offered for sale at a substantially lower price than current connectors.

A still further aspect of the invention is to provide a connective device that serves a number of potential end uses by having a non-complex general design which provides a great deal of flexibility and adaptability for various uses such as undersea, outer space and various applications at normal atmospheric pressures or in volatile atmospheres, due to a sliding bypass valve function.

A further aspect of the invention is to provide a reliable connector that can be mated and demated repeatedly in a hostile environment without failing.

Still another aspect of the invention is to provide a reliable connector that is easily connectable in the field, wherein connection to interconnecting cables and devices does not require highly specialized tools or fixtures. Termination techniques are the same as are typically found with commercial electrical and optical contact installation for electrical, optical, hybrid, hydraulic or gas connections.

Yet a further aspect of the invention is to allow from singular electrical circuit, or other connector type, to twenty (20) or more connector modules grouped within one overall support shell in the plug and receptacle halves.

BRIEF DESCRIPTION OF THE DRAWINGS

FIGS. 7a–b show a side cutaway view of an embodiment of the connector having a single fiber optic contact, accumulators on both the mating probe and receptacle halves for pressure compensation, and an external axial displacement spring for the sliding bypass valve. FIG. 7a is unmated. FIG. 7b shows the mated connection.

FIG. 8a shows a top cutaway view of the mated connector. FIG. 8b shows an exploded top cutaway view of the connector unmated.

FIGS. 10a–b are top cut away views of an embodiment of the invention having supporting spring rods embedded in the slitted flexible slidable tube to aid in closing the at least one axial slit in the slitted flexible slidable tube. FIG. 10a shows the position of the rods when the axial slit is closed. FIG. 10b shows the position of the rods when the axial slit is open.

DETAILED DESCRIPTION OF THE INVENTION

Figure 1:
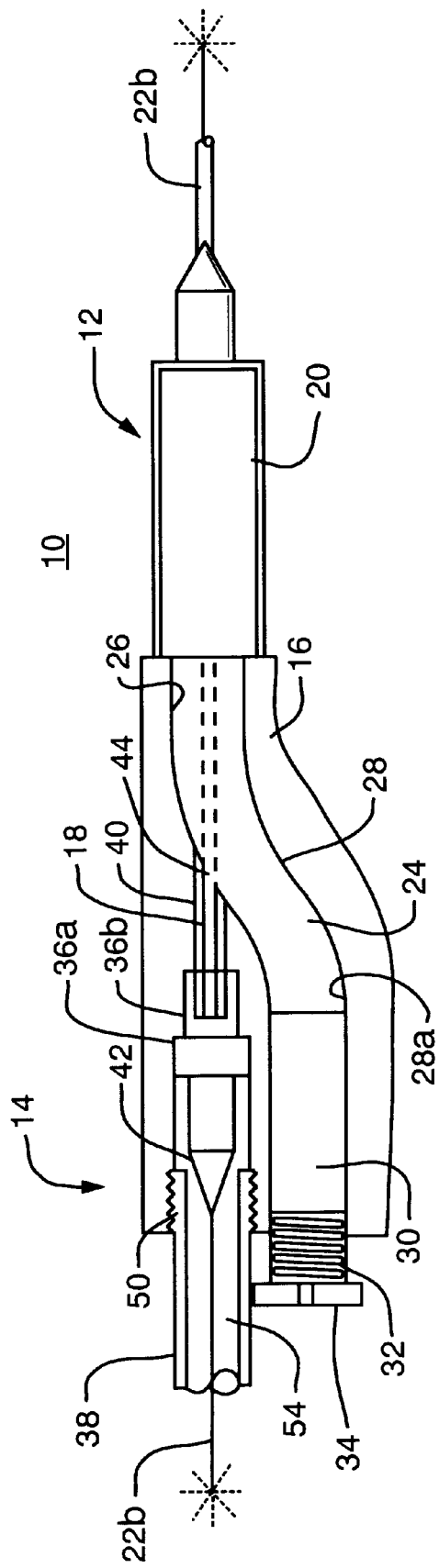
FIG. 1 is a partially cut away or cross sectional view of a non-pressure compensated fiber optic embodiment of the invention, in the mated condition.
Figure 2:
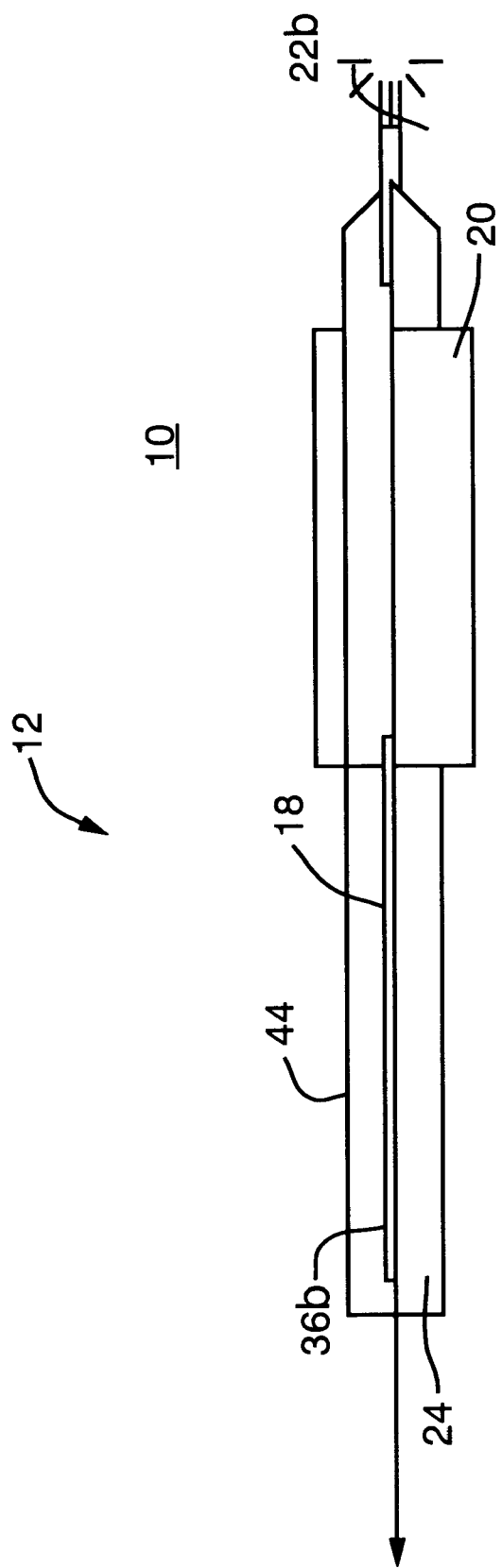
FIG. 2 is a partially cut away view of the probe connector half of a non-pressure compensated fiber optic embodiment of the invention in the unmated position.
Figure 3:
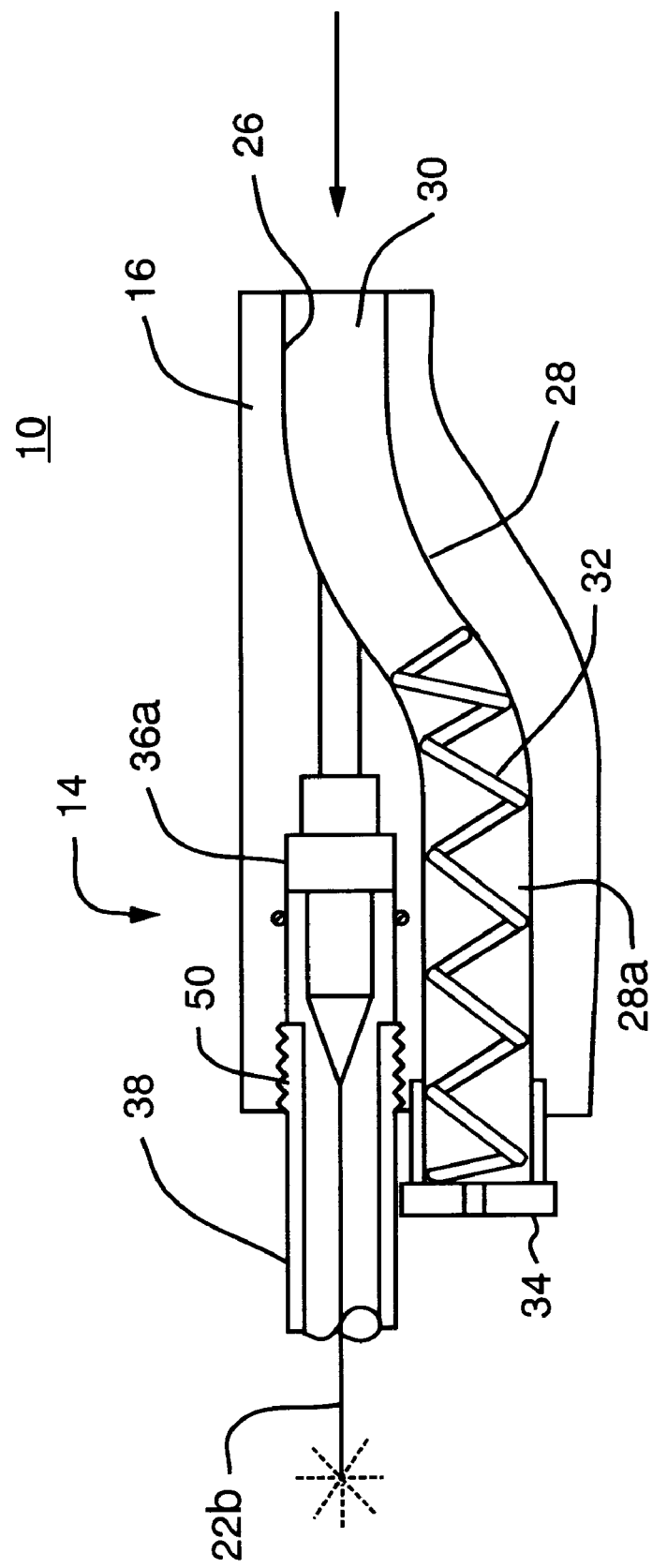
FIG. 3 is a partially cut away view of the receptacle connector half of a non-pressure compensated fiber optic embodiment of the invention in the unmated position.

Referring now to the figures, in which like reference numerals refer to like elements throughout, an embodiment of the invention, as shown in FIGS. 1–3 for a non-pressure compensated embodiment 10 of the invention, in the mated condition and in the unmated condition comprises: a plug or probe connector half or assembly 12 which includes an isolation envelope comprising in part at least one preferably axially slitted flexible slideable tube 24, containing at least one mating contact probe 18 which is connected to a cable or other transmission means shown in FIGS. 1–3 as a fiber optic cable 22b. Each mating probe connector half 12 may contain one or more probe contacts and each slitted flexible slideable tube 24 may have one or more slits 44. The slits are preferably axial but need not be. They may be perpendicular to the tube's lengthwise axis, for example. Probe half 12 can withstand open-faced exposure to differential pressures. There is a receptacle connector half or assembly 14 comprising a sliding bypass valve 28 and at least one isolated circuit contact shown in FIGS. 1–3 as a fiber optic contact 36. The receptacle connector half may be mounted on a bulkhead or electronic device when used for underwater connection. It is capable of withstanding open-faced differential pressure. The contacts used with the present invention may be either electrical, optical, hybrid electro-optical or hydraulic circuit end connections, or other types of connectors such as for natural gas, gasoline or oil. Although particular examples of possible contacts are depicted in the drawings, as examples, the drawings are general schematic representations, and are not intended as detailed depictions of every possible type of medium connectable with the invention. In the schematic representations of the drawings, each type of contact would look essentially the same, thus every possible representation of a contact is not shown. The connections are connected to a transmission means such as a cable or hose and secured with an oil tube adaptor 38 to seal the entrance of the transmission means to the receptacle half 14 containing the isolated circuit connector. The oil tube adapter 38 is basically an oil filled cable used to help balance or equalize pressure differences and is known as a PBOF (pressure balancing oil filled) cable. The area of receptacle half 14 where the transmission means enters receptacle half body 16 is sealed preferably by a Morrison or piston type seal shown as 50 in FIGS. 1 and 3. The bodies of the probe and receptacle contact halves may be formed from any suitable semi-rigid, machineable, moldable, formable, castable material such as a polymer resin, for example a polyethylene material, aluminum, copper, or other metal or metal hybrid materials. The pressure transfer or equalizing medium may be any non-reactive, non-corrosive material such as oil, grease, gel or other viscous or semi-viscous material such as a power in suspension or colloid.

The at least one isolated contact, shown in FIGS. 1–3 as an optical contact 36a, is located in a connection or mating chamber 42, and immersed in a pressure transfer medium 54. The ability to pass a mating contact probe 18 of the probe half 12 into isolated contact 36a of the receptacle half 14 requires the use of the SBV or sliding bypass valve 28. The body of the valve 28 contains a truncated C shaped, or curved, entrance passage 26 and valve chamber 28a. The entrance passage and valve chamber are preferably smooth-walled over the entire internal bore. The mating contact probe 18, shown in FIGS. 1–3 with a corresponding optical probe contact 36b on a mating end, in flexible slidable tube 24, enters the entrance passage 26, through sliding bypass valve 28 comprising in part secondary chamber 40. The probe contact 36b then passes into the connection chamber 42 to mate with the isolated contact 36a of the receptacle half 14, while the flexible slidable tube 24 enters the valve chamber 28a.

Figure 7B:
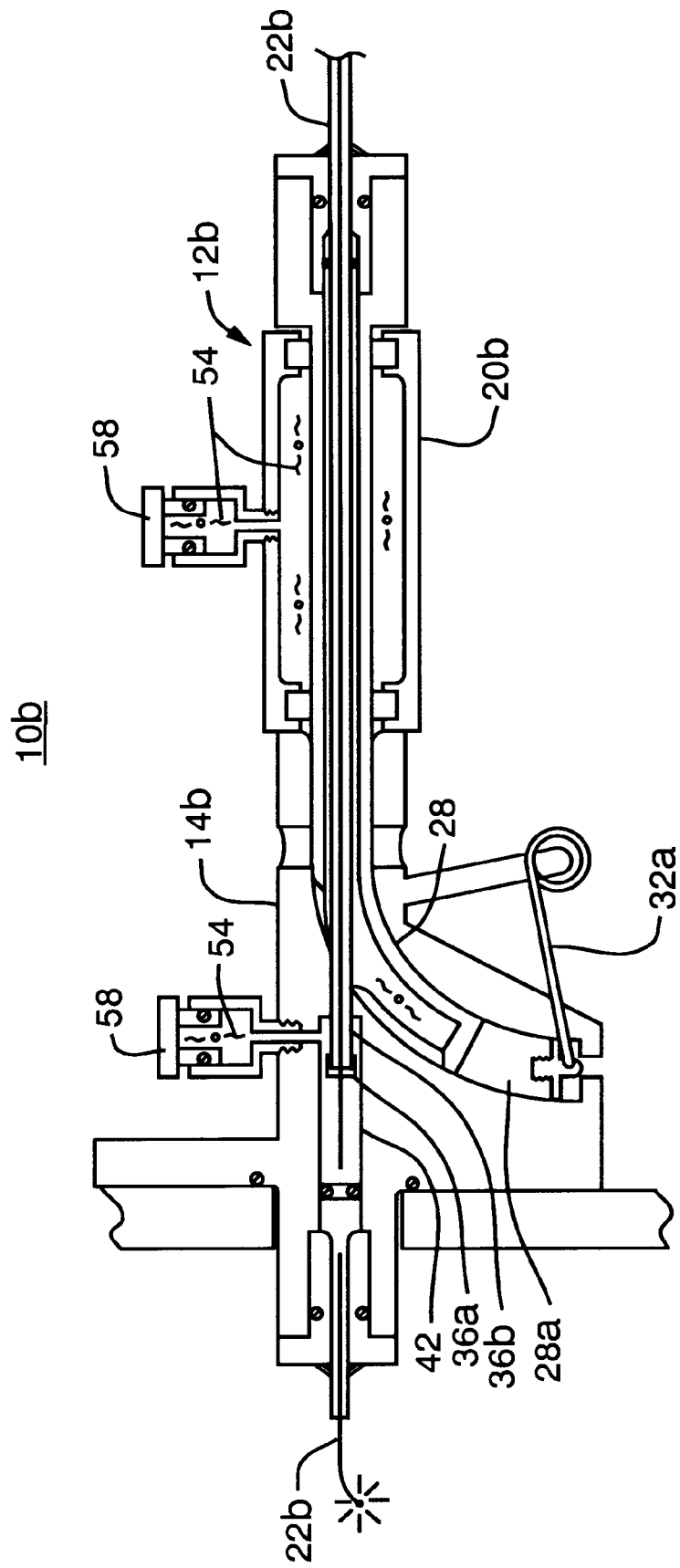

The sliding bypass valve assembly preferably includes a spring loaded rubber skirted piston assembly. There is a piston or plug 30, preferably of a rubber-like material, which fits snugly, yet slides freely in either direction, when lubricated by said pressure transfer medium, within the bore of the valve chamber 28a. The piston 30, although relatively long, is capable of deforming in shape which allows it to pass freely yet snugly within the C shaped bore of the entrance passage 26 and valve chamber 28a. An axial displacement spring or sliding bypass valve spring 32 closes the sliding bypass valve 28 and mating chamber 42 when receptacle half 14 is not mated. An externally mounted spring 32a, as shown in FIGS. 7a and 7b, may also be used with plug 30. During mating, the mating contact probe 18 forces the piston 30 rearward. In the closed, unmated condition, the axial displacement sliding bypass valve spring 32 or 32a acts to force the piston 30 to a position directly at the beginning of the entrance passage 26. With the piston 30 in this position, the entry port to the secondary chamber and the valve chamber are sealed against the free passage of liquid objects or gas. Axial displacement or sliding bypass valve spring 32 may be retained within the valve chamber 28a by a retaining pin, ring, or cap 34. When a mating probe half 18 pushes against the exposed end of the piston 30 at the entrance passage 26, the piston 30 is forced against sliding bypass valve spring 32. As the probe force increases, the piston 30 is pushed inward. As the contact probe 18 continues to enter the entrance passage 26, the piston 30 also continues to travel inward, down the entrance passage 26, eventually passing the secondary chamber entry point and moving into the valve chamber 28a. Liquid, gas or objects may now freely enter the secondary chamber 40 and come in contact with the mating contact probe 18. Closing of the valve works in reverse of the opening process. As the external probe force is diminished, axial displacement or sliding bypass valve spring 32 or 32a will act to drive the piston 30 back past the entrance to the secondary chamber, to the beginning of the entrance passage 26, thus sealing the secondary chamber and the valve chamber 40 from the outside environment.

The at least one contact probe 18, is preferably a semi-rigid yet flexible structure shown in FIGS. 1–3 wherein an optical contact 36b, is immersed in a pressure transfer or equalizing medium 54 and enclosed by an isolation envelope which may comprise axially slitted flexible slidable tube 24, and a rigid sheath 20 movable along slitted flexible slidable tube 24. The ability to pass the contact probe 18 from within the slitted flexible slidable tube 24 to mate its isolated circuit contact 36b with a contact, for example contact 36a, in a receptacle half 14 requires the use of the at least one preferably axial self-sealing slice, slit or window 44 along the side wall of the flexible slidable tube 24. The contact probe 18 passes out of the axially flexible slidable tube 24 by exiting the at least one axial slit 44 in the sidewall. A preferred slitted flexible slidable tube 24 may be a flexible 80 durometer rubber tube approximately 0.40" in outer diameter, but may be smaller or considerably larger in diameter depending on the application for which it is used. The at least one axial slit 44 may be any length. The length of slit 44 is directly proportional to the depth of insertion required of the contact probe 18 to enter the receptacle half and mate its isolated circuit contact with the circuit contact in the receptacle. The rear end (where the mating contact probe initially enters the slitted flexible slidable tube) is fully hermetically sealed or plugged. The rear end of the flexible slidable tube 24 is permanently pierced by the semi-rigid the shaft of the at least one isolated mating contact probe 18.

The isolation envelope may further comprise rigid sheath 20 containing pressure equalizing medium and surrounding a portion of slitted flexible slidable tube 24 and having a guiding means such that the at least one axial slit 44 is aligned to assure the at least one mating contact probe 18 is able to exit the at least one axial slit 44. The rigid sheath 20 also ensures that the at least one axial slit 44 remains closed when the connector is unmated. The rigid sheath 20 may be formed from materials including polymer resin, aluminum and copper or other like materials such as metals or metal hybrids that protect contact probe 18 and the slitted flexible slidable tube 24.

The flexible slidable tube 24 is capable of deforming in shape to allow it to pass freely, yet snugly when inserted within the curving, truncated C-shaped entrance passage 26 and valve chamber 28a of sliding bypass valve 28.

The mating contact probe 18 having an isolated contact, is a semi-rigid yet somewhat flexible assembly, as stated above. As the flexible slidable tube 24 follows the contour of the entrance passage 26, the semi-rigid mating contact probe 18 can not follow the bending path of the slitted flexible slidable tube 24 and must remain straight. Continued bending of the flexible slidable tube 24 into sliding bypass valve 28 causes the axial slice(s), slit(s) or window(s) 44 in the wall of the slitted flexible slidable tube 24 to open. This axial opening allows passage of the contact mating probe 18 outside of the flexible slidable tube wall. The at least one slit 44 is located at the point where the mating contact probe 18 contacts the wall of the slitted flexible slidable tube 24, and is fixed in location at the outer diameter of the bend radius of the slitted flexible slidable tube 24. The at least one slit 44 is necessary because slitted flexible slidable tube 24 will not fit into the secondary chamber 40 and thus must bend away as mating contact probe 18 moves straight into secondary chamber 40 which acts as part of the sliding bypass valve 28.

Figure 4:
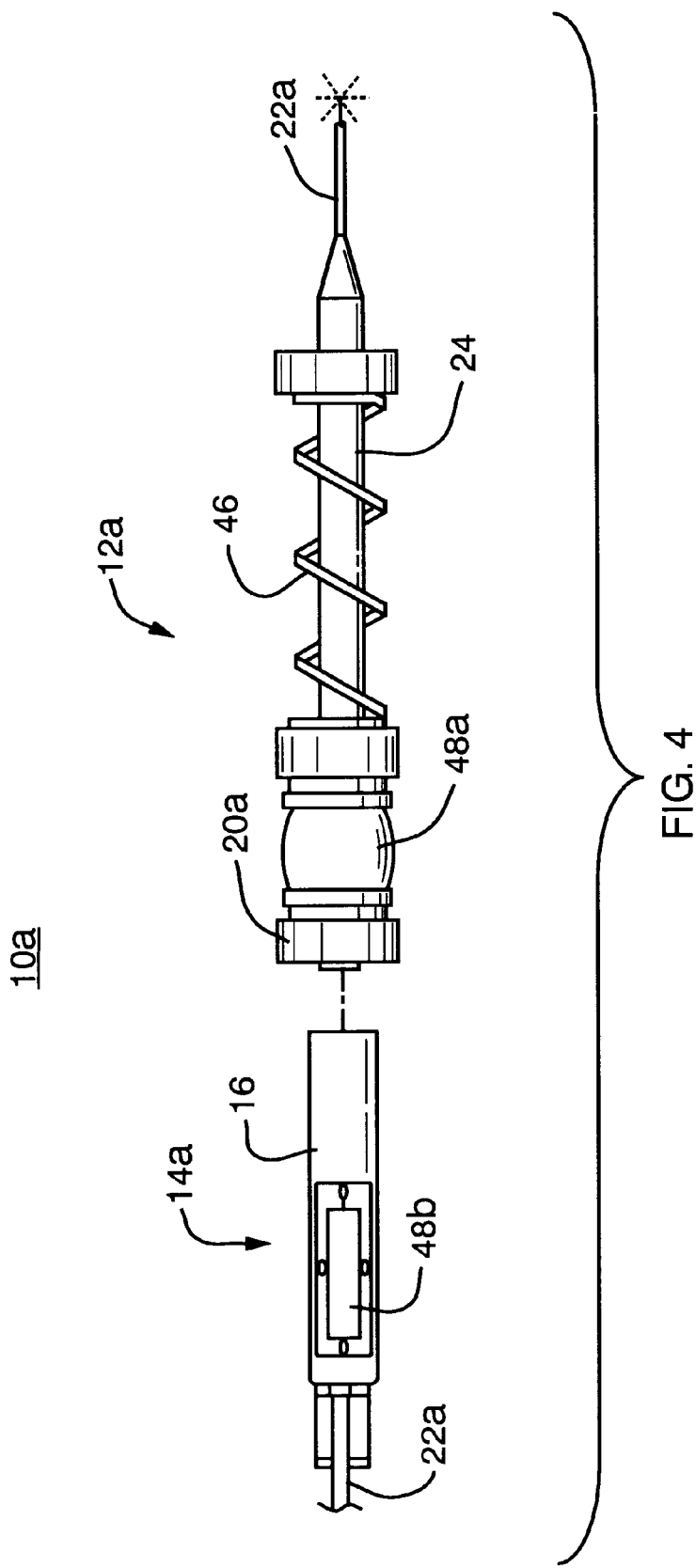
FIG. 4 is a top view of the probe and receptacle connector halves of a pressure compensatable electrical contact embodiment of the invention having a flexible diaphragm, in the unmated position.
Figure 5:
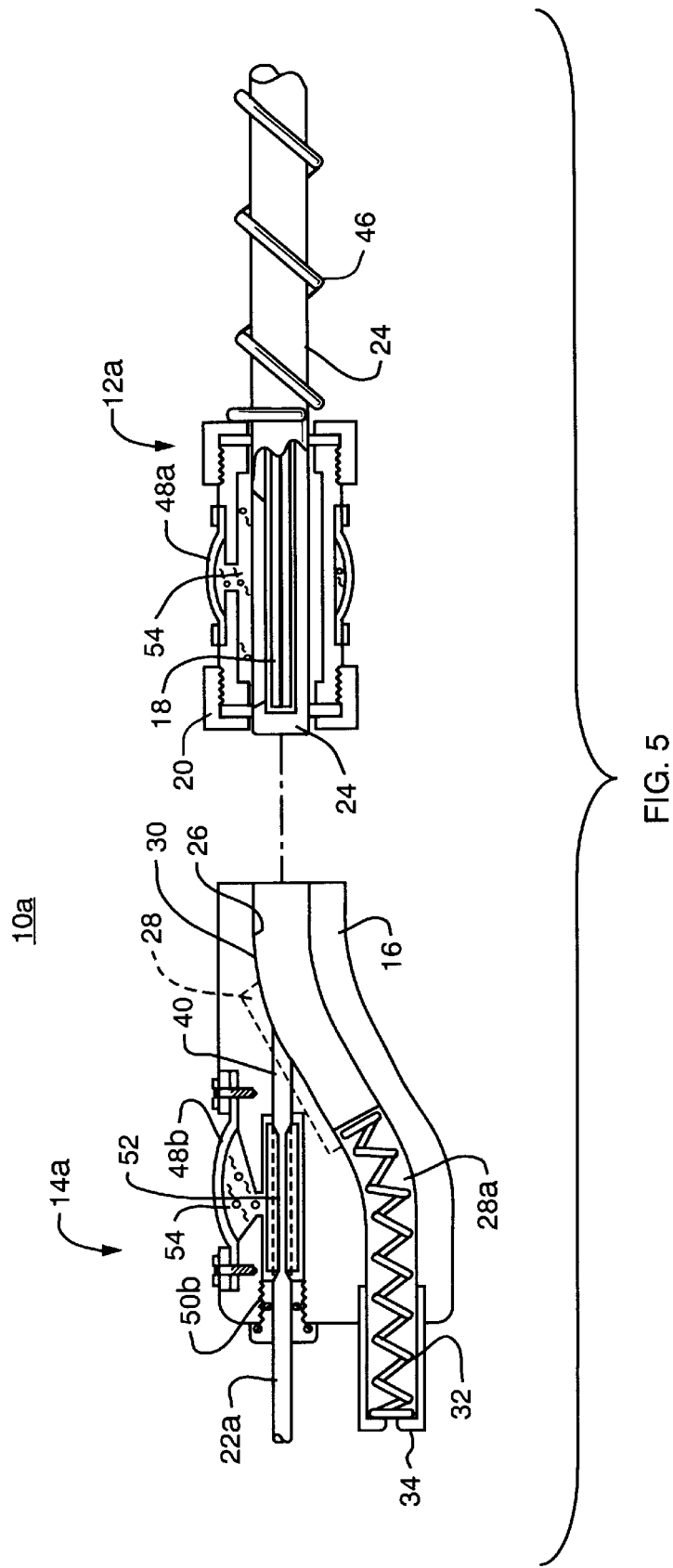
FIG. 5 is a partially cut away view of the probe and receptacle connector halves of a pressure compensatable electrical contact embodiment of the invention having a flexible diaphragm, in the unmated position.
Figure 6:
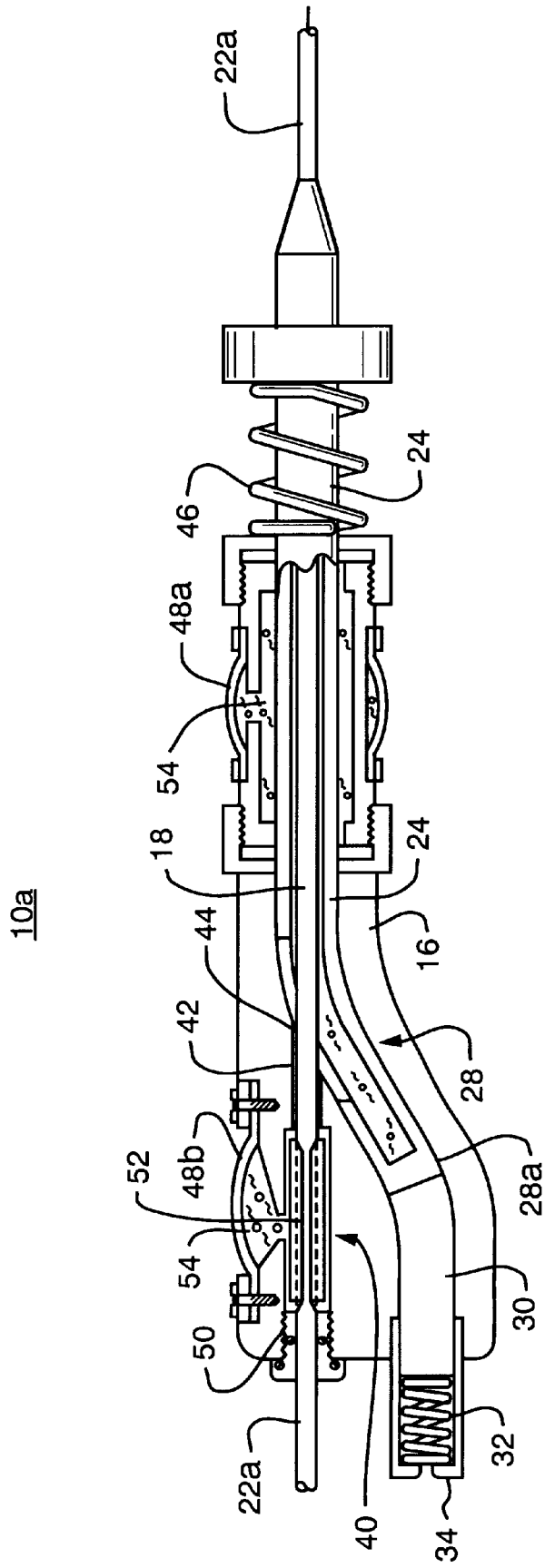
FIG. 6 is a partially cut away view of a pressure compensatable electrical contact embodiment of the invention having a flexible diaphragm, in the mated position.

The probe connector half 12 may also further comprise a return spring 46 coiled around slitted flexible slidable tube 24 as shown in FIGS. 4–6. Return spring 46 is compressed axially along the slitted flexible slidable tube 24, as the plug connector half 12 is mated with the receptacle half 14, and then aids in demating as return spring 46 returns to its un-compressed state.

As shown in FIGS. 4–6 there is an embodiment of the invention 10a that is pressure compensated by way of a container 20a sheathing the slitted flexible slidable tube 24 and protecting said at least one axial slit 44. At least a portion of the wall of the container 20a may be formed of a flexible diaphragm structure 48a. The container 20a is filled with pressure transfer medium 54. The container 20a is movable along the slitted flexible slidable tube 24. The pressure transfer medium 54 and the flexible diaphragm 48a allow better pressure compensation than pressure transfer medium 20. The main body 16 of the receptacle connector half 14a may also have a portion of the wall of the main body formed from a diaphragm material 48b, which may be formed of a flexible diaphragm material similar to that of diaphragm material 48a, yet structurally assembled differently to fit and work with the receptacle half as opposed to the probe half of the connector. The portion of the body 16 covered by the diaphragm is a portion of the wall of the connection chamber 42 such that the connection chamber 42 is pressure compensated by expansion and contraction of the diaphragm structure 48b and the pressure transfer medium 54. The receptacle connector half 14a having a diaphragm 48b may be used with a probe connector half with, or without, a diaphragm mechanism, but is shown in FIGS. 4–6 as probe connector half 12a with a diaphragm structure 48a. Also, probe connector half 12, without a diaphragm mechanism, may be used with a receptacle half with, 14a, or without, 14, a diaphragm mechanism. The container 20a of probe connector half 12a may be sealed by a Morrison or piston type seal 50a where transmission means 22a enters slitted flexible slidable tube 24. Also sealed by a Morrison or piston type seal 50b is the area of receptacle half 14a where electrical transmission means 22a enters the receptacle half body 16. Shown in FIGS. 5 and 6 is an electrical contact 52 in the receptacle connector half 14a.

As shown in FIGS. 7a and b, another embodiment of the invention 10b may be pressure compensated at the probe connector half 12b by an isolation envelope comprising a container 20b having a piston activated accumulator 58 instead of a diaphragm structure. The container 20b and accumulator 58 are filled with the pressure transfer or equalizing medium 54 and changing pressure is compensated by the piston sliding in or out in response to pressure changes. Both the probe half 12b and receptacle half 14b may have an accumulator 58. Accumulator 58 (and diaphragm where used) is in flow communication with the connection chamber 42 of receptacle half 14b.

FIGS. 7a and b also show the embodiment of the invention, 10b, having accumulator 58 on both receptacle half 14b and probe half 12b, with an external axial displacement sliding bypass valve spring 32a for sliding bypass valve 28. A return spring 46 is not shown on probe half 12b but one may certainly be included in any of the embodiments. FIG. 7a shows the connector unmated, and FIG. 7b shows the connector mated. As described briefly above, FIGS. 7a and b show the use of an external axial displacement sliding bypass valve spring 32a with the sliding bypass valve 28. With the use of such a spring 32a, there is no cap 34 at the end of the valve chamber 28a which is therefore left open to the outside environment. The outside medium, for example water, would then be free to enter the open end of the valve chamber when the connector is unmated and would be pushed out of the valve chamber as the connector is mated, thereby aiding in the pressure compensation process. The particular embodiment shown in FIGS. 7a and 7b also shows both the receptacle half 14c and probe half 12c with an accumulator 58 to aid in pressure compensation.

The various types of probe connector halves and receptacle connector halves may be used interchangeably with each other in different combinations. For example, a receptacle half with a diaphragm may be used with a probe half having an accumulator.

Figure 8A:
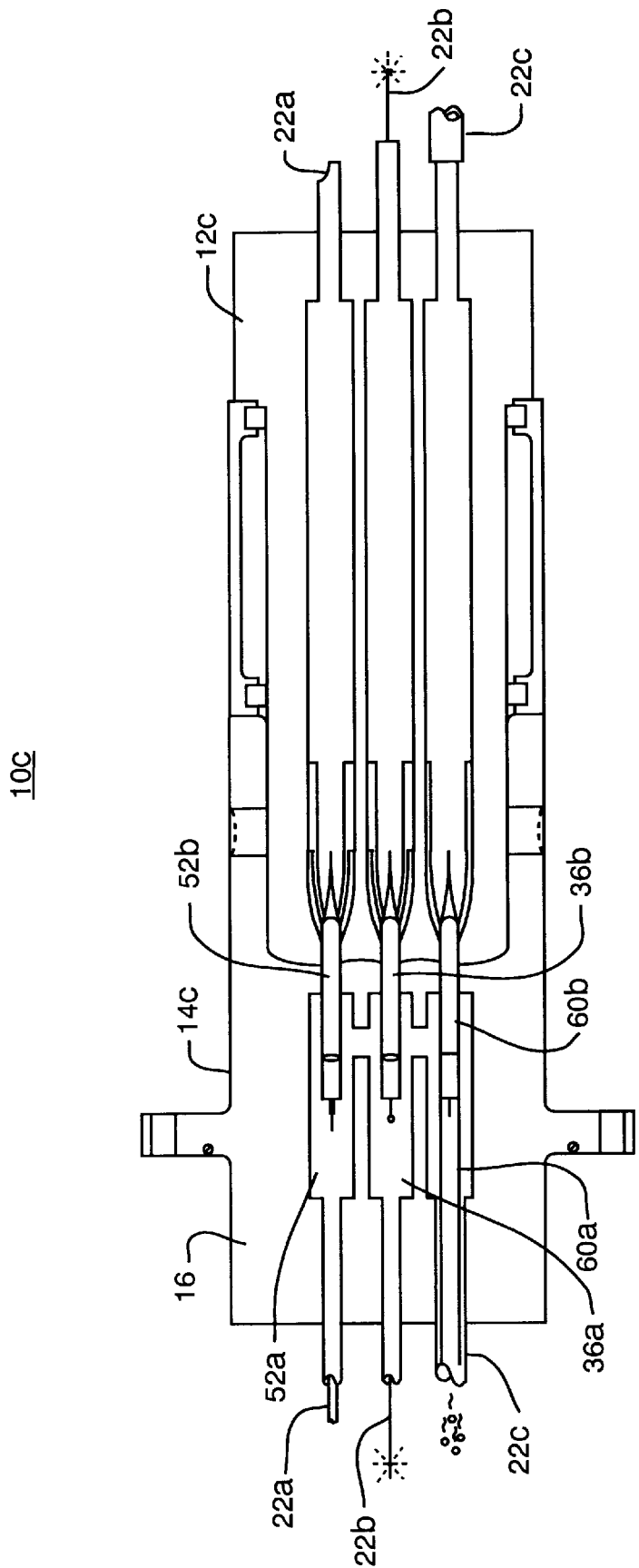
FIGS. 8a–b are partially cut away views of an embodiment of the invention having three mating probes in a slidable flexible tube with three axial slits, wherein one probe is shown as an electrical probe, one fiber optic, and one hydraulic.
Figure 8B:
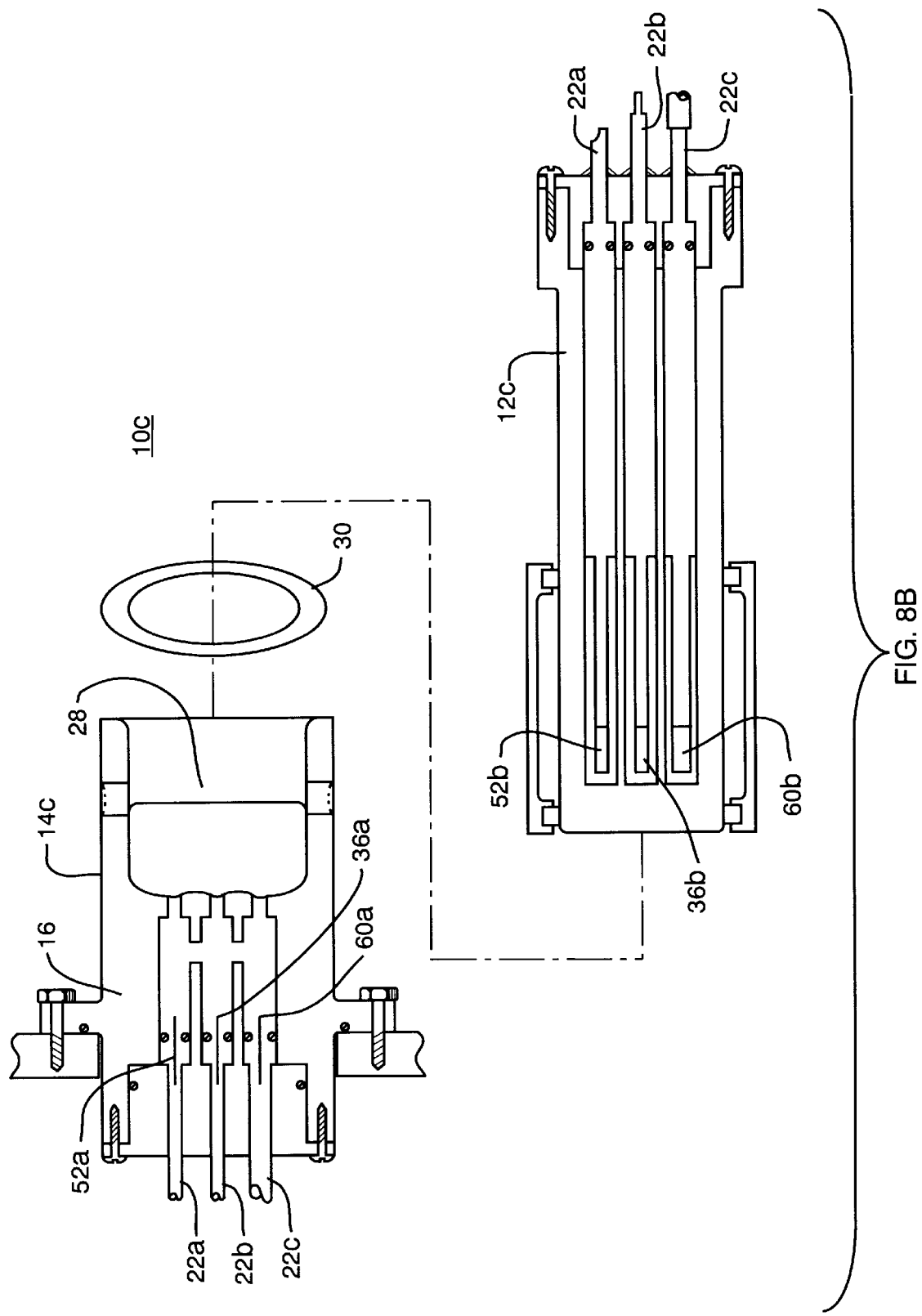

FIGS. 8a and b show an embodiment of the invention 10c, having three mating probe contacts, instead of one, and three isolated contacts. In this embodiment the three mating probes would be housed in a slitted flexible slidable tube would wherein the slitted flexible slidable tube have three corresponding axial slits, not shown. In FIGS. 8a and b the probe contacts are shown as an electrical contact 52a and 52b connected to electrical transmission means 22a, a fiber optic contact 36a and 36 b connected to fiber optic transmission means 22b, and a hydraulic contact 60a and 60b connected to hydraulic transmission means 22c.

Figure 9:
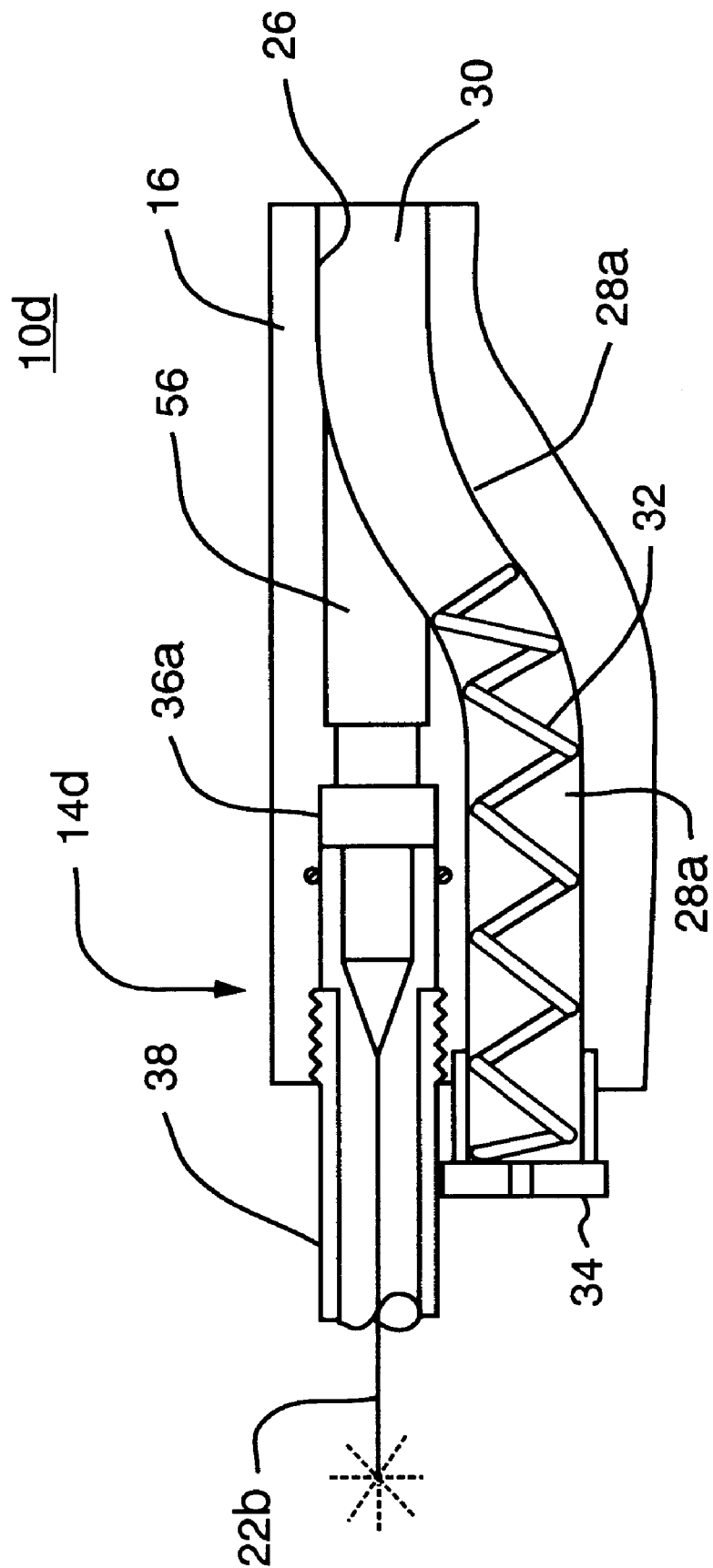
FIG. 9 is a side cut away view of a receptacle half having an axially slitted seal, in the body of the receptacle half, as part of the sliding bypass valve, and through which a probe must pass in order to mate with the isolated contact of the receptacle half.

In addition to the sliding bypass valve described above, there may also be a sliding bypass valve having an axially slitted seal 56, (instead of a narrow secondary chamber), secured in the body of the receptacle connector half, and shown as embodiment 10d in FIG. 9. The axially slitted seal 56 is secured in the body 16 of the receptacle connector half 14d between the entrance passage 26 and the connection chamber 42, where the secondary chamber is located in other embodiments. The axially slitted seal 56 is secured so that it does not move within the receptacle half 14d. The diameter of the axially slitted seal 56 is less than that of the flexible slidable tube 24 such that when the slitted flexible slidable tube 24, with the at least one mating contact probe inside 18, is pushed through the entrance passage 26, the slitted flexible slidable tube 24 encounters the axially slitted seal 56 and can not enter it. The at least one mating probe 18 of probe connector half 12d is then forced out through the at least one axial slit 44 in the slitted flexible slidable tube 24 to contact the at least one isolated contact in the connection chamber 42.

There is yet another embodiment of the invention 10e, as shown in FIGS. 10a and b wherein axial supporting spring rods 62 having good memory characteristics may be embedded in the material of the slitted flexible slidable tube, on either side of the at least one axial slit 44 seen in FIG. 10b, such that the spring rods 62 help close the at least one slit 44 (not shown in FIG. 10a because tube 24 is cut away to show probe 18 and rods 62) when the probe half is not mated. The spring rods 62 help open and close, and keep closed, the at least one axial slit 44 to ensure protection and isolation of the probe contact. Spring rods 62 perform the same functions as the rigid sheath 20 and containers 20a and b. However, for applications at normal pressures and where there is not extreme volatility of the atmosphere, a slitted flexible slidable tube with spring rods may be used alone in the probe connector half with no rigid sheath and no container, and therefore no pressure compensation on the probe connector half 12e. If the system merely requires protection and isolation, a slitted flexible slidable tube may be used alone, or may have spring rods and/or a return spring 46. FIG. 10e shows the position of spring rods 62 when the axial slit is closed. FIG. 10b shows the position of spring rods 62 when the axial slit is open.

In summary, in operation of any of the above embodiments, when mating, the slitted flexible slidable tube and probe exert an inward 'pushing' force against the receptacle's flexible axial displacement piston of the sliding bypass valve. Continued pushing by the flexible slidable tube and probe will force the piston to displace rearwardly down the valve chamber. At the point where the piston has cleared the entrance of the secondary chamber or slitted seal (where the curved valve chamber of the sliding bypass valve (SBV) diverts from the entrance passage), the forced bending of the slitted flexible slidable tube forces the internal mating contact probe(s) to exit the slitted flexible slidable tube via the now opened sidewall axial slit(s). The pressure transferring or equalizing media of both the connection chamber and the slitted flexible slidable tube are then free to mix and equalize pressure.

Continued forced entry of the probe half into the receptacle half forces the mating probe contact to enter straight into the secondary chamber, or the axially slitted seal. At the other end of the secondary chamber or seal is a mating, connection, or contact chamber, and centered within the mating or connection chamber is/are the receptacle isolated circuit contact(s)—optic, electrical, hybrid or other type contact such as liquid or hydraulic.

Precision alignment of the probe and receptacle isolated contacts in the connection chamber is accomplished by conventional contact self alignment methods. Both probe and receptacle contacts are free to float or move (to a slight degree) within the overall outer mated receptacle half and mating probe half shells or bodies. This flexibility or "float" enables and insures proper alignment of the sensitive contacts. As shown in FIGS. 8a and b, with three contacts, there may be one or more contacts, up to 20 or more even, in both the plug or probe half and the receptacle half of the connector. The plug or probe half body and slitted flexible slidable tube, and receptacle half are adjusted accordingly in size depending on the number and type of contacts present.

A key to this invention and its many applications is the action of the sliding bypass valve wherein a protected contact may be mated and demated with another protected contact easily and with neither contact being exposed to the outside environment if necessary. Such a connection assembly or connector may even be used in an application such as filling a vehicle gas tank using a sliding bypass valve in the vehicle and thereby preventing any gas spillage.

Although the present invention has been described with the above-identified preferred embodiments, workers skilled in the art will recognize that changes may be made in form and detail of structure and operation without departing from the spirit and scope of the invention.

Accordingly, what is claimed is:

1. A pressure compensatable mateable connector comprising:

a probe connector half and a receptacle connector half which are repeatable mateable and de-mateable, wherein said probe connector half comprises at least one mating probe contact immersed in a pressure transfer medium, and contained in an isolation envelope which comprises in part a slitted, flexible, slidable tube which is sealed at both a rear end and a mating end, wherein said at least one mating probe is contained within said slitted flexible slidable tube, and enters said slitted flexible slidable tube through a hermetic fitting securely fitted to said rear end of said slitted flexible slidable tube, and wherein said receptacle connector half comprises an entrance passage, at least one receptacle isolated circuit contact contained in a mating chamber and immersed in said pressure transfer medium, and a sliding bypass valve in flow communication with said entrance passage and said mating chamber and through which each said at least one mating probe contact must pass in order to connect with each corresponding said at least one receptacle isolated circuit contact.

2. The pressure compensatable mateable connector of claim 1 wherein said slitted flexible slidable tube has at least one axial slit cut through a portion of said slitted flexible slidable tube, said at least one axial slit terminating near said mating end such that a portion of said at least one mating probe contact is exposable through said at least one axial slit.

3. The pressure compensatable mateable connector of claim 1 wherein said isolation envelope further comprises a rigid sheath containing said pressure transfer medium and surrounding a portion of said slitted flexible slidable tube wherein said rigid sheath has a guiding means such that said at least one axial slit is aligned to allow said at least one mating probe contact to exit said at least one axial slit, and wherein said rigid sheath ensures that said at least one axial slit remains closed when said probe connector half is unmated.

4. The pressure compensatable mateable connector of claim 1 wherein said isolation envelope further comprises a container having a piston activated accumulator wherein said container is filled with said pressure transfer medium, and wherein said pressure transfer medium and said piston of said accumulator adjust the pressure inside said probe connector half to the pressure outside said probe connector half, and wherein said container encloses a portion of said slitted flexible slidable tube and ensures that said at least one axial slit remains closed when said probe connector half is unmated.

5. The pressure compensatable mateable connector of claim 1 wherein said mating chamber comprises a flexible diaphragm structure as part of a wall of said mating chamber wherein said flexible diaphragm is filled with said pressure transfer medium and expands and contracts to aid in pressure compensation.

6. The pressure compensatable mateable connector of claim 1 wherein said receptacle connector half further comprises a piston activated accumulator in flow communication with said mating chamber and filled with said pressure transfer medium to aid in pressure compensation.

7. The pressure compensatable mateable connector of claim 1 wherein said slitted flexible slidable tube is formed from a non-compressible, flexible material having good memory characteristics.

8. The pressure compensatable mateable connector of claim 1 wherein said at least one mating probe contact and said at least one isolated circuit contact are chosen from the group consisting of electrical, fiber optic, hybrid electro optic, hydraulic and gas contacts.

9. The pressure compensatable mateable connector of claim 1 wherein said sliding bypass valve comprises an axially slitted seal secured in said receptacle connector half between, and in flow communication with, said entrance passage and said mating chamber wherein said slitted flexible slidable tube is too large in diameter to fit into said axially slitted seal thus said at least one mating probe is forced out through said axially slit in said slitted flexible slidable tube and is then forced through said axially slitted seal, as said slitted flexible slidable tube is forced into said valve chamber when said slitted flexible slidable tube meets said axially slitted seal and cannot enter.

10. The pressure compensatable mateable connector of claim 1 wherein a main body of said probe connector half and a main body of said receptacle connector half are formed from a semi-rigid, machineable, moldable, formable, or castable material.

11. The pressure compensatable mateable connector of claim 1 wherein said receptacle connector half and said probe connector half are formed from a material chosen from the group consisting of polymer resin, aluminum, copper, metal and metal hybrid material.

12. The pressure compensatable mateable connector of claim 1 wherein said pressure compensating medium is chosen from the group consisting of: oil, grease, non-reactive viscous material, non-reactive semi-viscous material, powder, suspension and colloid.

13. The pressure compensatable mateable connector of claim 1 wherein said connector further comprises a return spring extending along the length of said slitted flexible slidable tube from said rigid sheath to said hermetically sealed rear end of said slitted flexible slidable tube.

14. A pressure compensatable mateable connector of claim 1 wherein said isolation envelope further comprises a container having a flexible diaphragm structure wherein said container is filled with said pressure transfer medium and wherein said pressure transfer medium and said flexible diaphragm structure adjust the pressure inside said probe connector half to the pressure outside said probe connector half, and wherein said container encloses a portion of said slitted flexible slidable tube and ensures that said at least one axial slit remains closed when said probe connector half is unmated.

15. The pressure compensatable mateable connector of claim 14 wherein said connector further comprises a return spring extending along the length of said slitted flexible slidable tube from said container to said hermetically sealed rear end of said slitted flexible slidable tube.

16. The pressure compensatable mateable connector of claim 4 wherein said connector further comprises a return spring extending along the length of said slitted flexible slidable tube from said container to said hermetically sealed rear end of said slitted flexible slidable tube.

17. The pressure compensatable mateable connector of claim 1 wherein said sliding bypass valve further comprises a secondary chamber in fluid flow communication between said entrance passage and said mating chamber wherein said slitted flexible slidable tube is too large in diameter to fit into said secondary chamber and is therefore forced into a valve chamber as said probe connector half is pushed into said receptacle connector half, and said mating probe contact is forced out of said slitted flexible slidable tube into said secondary chamber and eventually into said mating chamber as said slitted flexible slidable tube is forced into said valve chamber.

18. The pressure compensatable mateable connector of claim 17 wherein said sliding bypass valve further comprises said valve chamber in fluid flow communication with said entrance passage, a sliding bypass valve plug contained in said valve chamber, and a sliding bypass valve spring at an end of said valve chamber, against which valve spring said sliding bypass valve plug rests and which forces said sliding bypass valve plug toward said entrance passage to seal said valve chamber from said entrance passage when said receptacle connector half is unmated.

19. The pressure compensatable mateable connector of claim 18 wherein said sliding bypass valve spring is internal to said valve chamber and is held in place at an end of said valve chamber by a spring retainer cap.

20. The pressure compensatable mateable connector of claim 18 wherein said sliding bypass valve spring is external to said valve chamber and is anchored to a portion of said receptacle connector half and wherein an end of said valve chamber is open to the external environment.

21. A pressure compensatable mateable connector comprising:

a probe connector half having an isolation envelope comprising in part a slitted flexible slidable tube enclosing at least one mating probe contact fed through a rear end of said slitted flexible slidable tube and extending substantially the length of said slitted flexible slidable tube, said slitted flexible slidable tube hermetically sealed at both said rear end and a mating end; at least one axial slit formed in a section of wall of said slitted flexible slidable tube near said mating end, wherein said isolation envelope contains a pressure transfer medium, such that said at least one mating probe contact is isolated from the outside environment and always in contact with said pressure transfer medium; a receptacle connector half comprising an entrance passage, at least one isolated contact disposed in a mating chamber connected in fluid flow communication with said entrance passage and containing said pressure transfer medium, and a sliding bypass valve also connected in fluid flow communication with said entrance passage wherein said probe connector half is pushable into said receptacle connector half such that when said probe connector half is pushed through said entrance passage, said at least one mating probe contact is forced, by said sliding bypass valve, through said at least one axial slit in said slitted flexible slidable tube, through said sliding bypass valve and into said mating chamber to contact said at least one isolated circuit contact, wherein said slitted flexible slidable tube is forced into a valve chamber of said sliding bypass valve.

* * * * *